June 7, 1927.

F. D. ALLEN 1,631,906

DEMOUNTABLE RIM

Filed June 3, 1926

Inventor

F. D. Allen.

By Lacey & Lacey, Attorneys

June 7, 1927. 1,631,906
F. D. ALLEN
DEMOUNTABLE RIM
Filed June 3, 1926 2 Sheets-Sheet 2
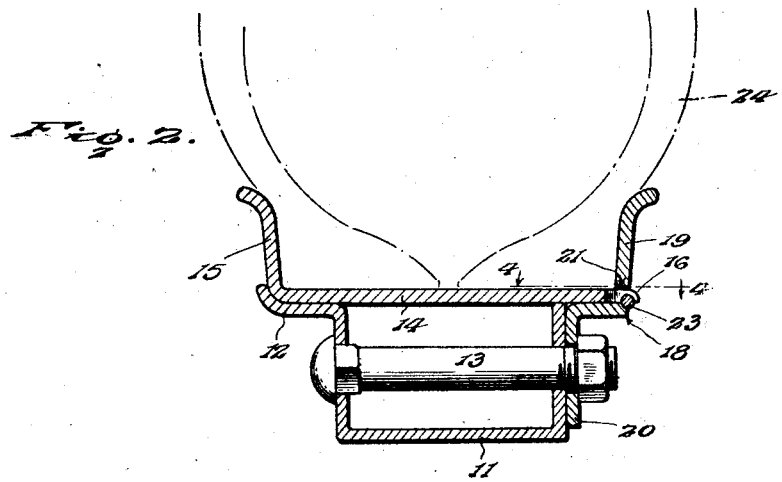
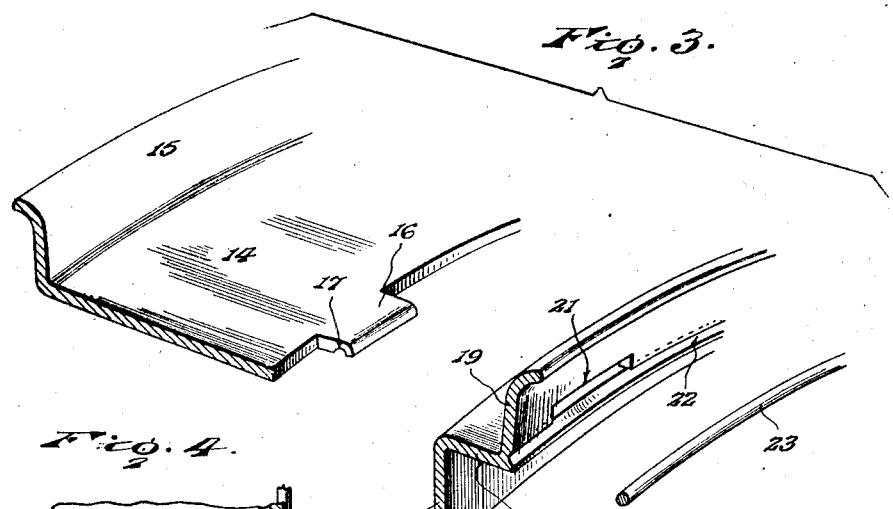
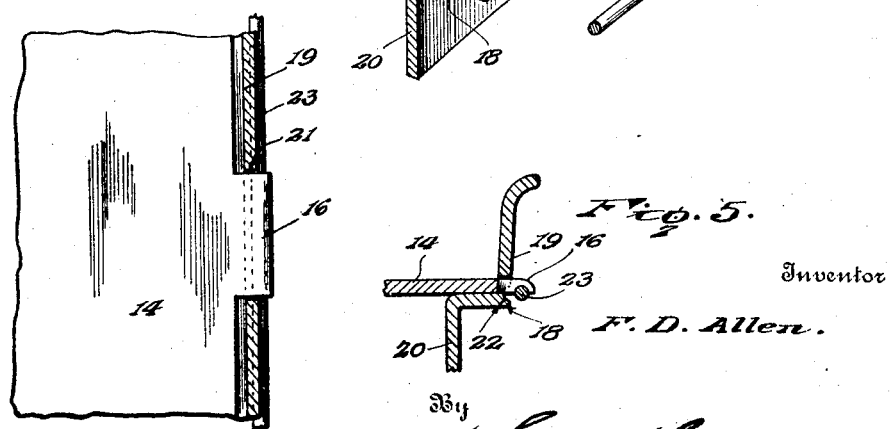
Inventor
F. D. Allen.
By Lacey & Lacey, Attorneys Patented June 7, 1927.

1,631,906

UNITED STATES PATENT OFFICE.

FRED D. ALLEN, OF PORTSMOUTH, VIRGINIA.

DEMOUNTABLE RIM.

Application filed June 3, 1926. Serial No. 113,510.

This invention relates to an improved demountable rim particularly designed for use in connection with the wheels of motor vehicles, and seeks, among other objects, to provide a rim which may not only be easily and quickly removed from a wheel but wherein a tire may be easily removed from or replaced upon the rim.

The invention seeks, as a further object, to provide a rim embodying a removable side ring which may be displaced to permit the removal of the tire from the rim and wherein novel means will be provided for normally locking the side ring in position on the rim body.

And the invention seeks, as a still further object, to provide a rim wherein the side ring will be shaped to overlie the wheel felly at one side thereof so that bolts carried by the felly may be arranged to extend through said ring for securing the rim in position on the wheel.

Other objects of the invention not specifically mentioned in the foregoing, will appear during the course of the following description.

In the accompanying drawings:

Figure 2 is a transverse sectional view on the line 2—2 of Figure 1.

Figure 3 is a fragmentary perspective view particularly showing one of the side lugs of the rim body and associated details.

Figure 4 is a fragmentary circumferential sectional view on the line 4—4 of Figure 2, looking in the direction indicated by the arrows.

Figure 5 is a detail sectional view showing the side ring shifted to permit the removal of the spring locking ring.

Figure 1:
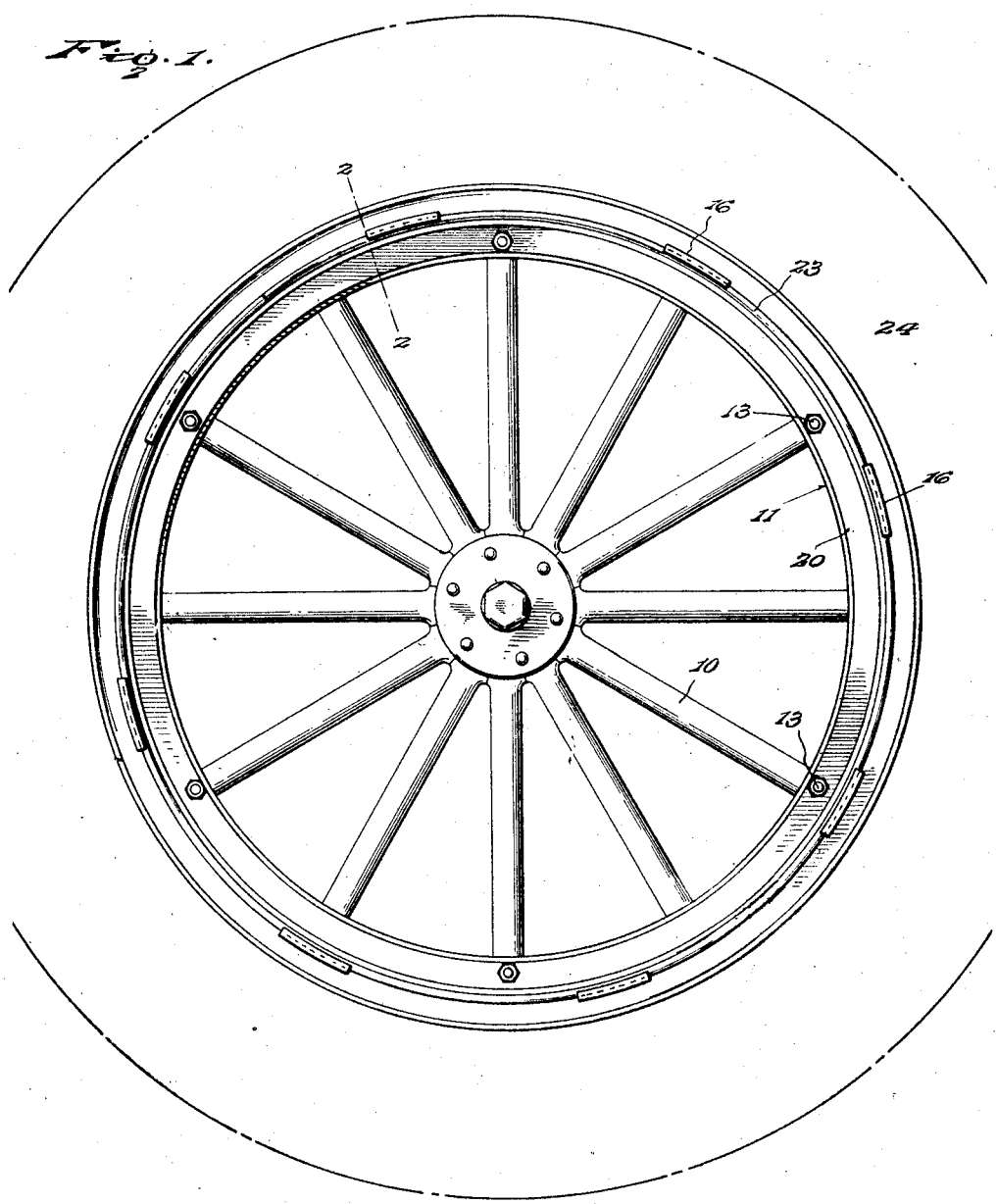
Figure 1 is a side elevation showing a wheel equipped with my improved rim.

Referring now more particularly to the drawings, I have shown an automobile wheel at 10. This wheel is provided with a channel-shaped felly 11, the inner side wall of which, or, in other words, that side wall disposed next to a vehicle body, is provided with an annular overhanging flange 12. The peripheral edge of the outer side wall of the felly lies flush with the outer face of said flange, and extending through the side walls of the felly at suitably spaced points are rim securing bolts 13.

The rim is of a diameter to snugly surround the felly and includes a rim body 14 having an integral side flange 15, and projecting from the edge of the rim body at its opposite side is a plurality of suitably spaced lateral lugs 16 in the inner sides of which are formed substantially semi-cylindrical grooves 17. Mating with the rim body is a side ring 18 having an intermediate offset portion from which projects an outer annular flange 19 like the flange 15 of the rim body, and an inner annular flange 20 which is flat. Formed in the flange 19 at the base thereof are slots 21 which freely receive the lugs 16 of the rim body, and formed in the outer side face of said flange to intersect said slots is an annular substantially semi-cylindrical groove 22. Seated in said groove is a split resilient locking ring 23 which, as particularly seen in Figure 2, is seated in the grooves 17 of the lugs 16, the ring expanding against said lugs. The locking ring is thus securely engaged with the lugs for rigidly limiting the side ring 18 against lateral displacement so that the outer flange 19 of the ring will be supported to cooperate with the flange 15 for retaining a tire, as conventionally illustrated at 24, on the rim. The rim may, of course, be either of the straight side or clincher type and, as will be appreciated, when the tire is inflated, the tire will expand against the flange 19 of the ring 18 for holding said ring against the locking ring 23 and maintaining the groove 22 tightly in engagement with the locking ring. The wall of the groove will thus coact with the locking ring for preventing contraction thereof and consequently locking the locking ring against accidental disengagement from the lugs 16. The side ring 18 is thus securely fastened upon the rim body so that as the tire expands against the flange 19 of said ring, the ring 18 may fulcrum on the ring 23 until the intermediate offset portion of said side ring abuts the rim body at its inner circumference when, as will be perceived, said offset portion will coact with the rim body and with the locking ring 23 for rigidly sustaining the side ring in place.

The rim is slipped over the felly 11 from the outer side thereof until the side flange 15 of the rim abuts the lip at the outer edge of the side flange 12 of the rim, when the inner flange 20 of the ring 18 will be disposed close to the outer side wall of the felly. As brought out in Figure 2, the flange 20 is apertured to freely receive the outer ends of the bolts 13 so that by applying the nuts of said bolts, after the rim has been initially arranged in position, and adjusting said nuts, the rim may be shifted laterally on the felly and firmly clamped in position, the flange 20 of the ring 18 being finally brought into abutting relation with the outer side wall of the felly.

As will now be perceived in view of the foregoing, the rim may be removed from the felly 11 by first removing the nuts of the bolts 13, when the rim may be slipped from the felly. To remove the tire, the tire is deflated, when the side ring 18 is shifted inwardly on the lugs 16, as shown in Figure 5, until the groove 22 in the flange 19 of said ring clears the locking ring 23. The locking ring may then, of course, be readily flexed out of engagement with the lugs 16, when the side ring 18 may be slipped over said lugs. The tire may then be readily removed from the rim body and may, of course, be replaced with equal facility, when, as will be appreciated in view of the foregoing, the parts may be easily assembled and the rim again replaced upon the wheel.

Having thus described the invention, what I claim is:

1. A demountable rim including a rim body having lateral lugs provided with grooves, a removable side ring carried by said lugs and having a groove therein for registration with the grooves of the lugs, and a locking ring engaged in the grooves of said lugs and grooves of the locking ring, as and for the purpose set forth.

2. A demountable rim including a rim body having lateral marginal lugs, a side ring slotted to receive said lugs, said lugs and side ring being provided, respectively, with grooves, and a removable locking ring common to the respective grooves, as and for the purpose set forth.

In testimony whereof I affix my signature.

FRED D. ALLEN. [L. S.]